United States Patent [19]
Yokoyama et al.

[11] Patent Number: 6,130,280
[45] Date of Patent: Oct. 10, 2000

[54] HIGH-RIGIDITY OXYMETHYLENE POLYMER RESIN MOLDING

[75] Inventors: Hiroshi Yokoyama; Hajime Nagahara, both of Kurashiki, Japan

[73] Assignee: Asahi Kasei Kogyo Kabushiki Kaisha, Osaka, Japan

[21] Appl. No.: 09/331,784

[22] PCT Filed: Dec. 25, 1997

[86] PCT No.: PCT/JP97/04860

§ 371 Date: Jun. 25, 1999

§ 102(e) Date: Jun. 25, 1999

[87] PCT Pub. No.: WO98/29483

PCT Pub. Date: Jul. 9, 1998

[30] Foreign Application Priority Data

Dec. 25, 1996 [JP] Japan .................................. 8-355850
Dec. 26, 1996 [JP] Japan .................................. 8-356376

[51] Int. Cl.[7] ...................................................... C08K 3/38
[52] U.S. Cl. ........................... 524/404; 524/402; 524/442; 524/449; 524/451; 428/402
[58] Field of Search .................... 524/402, 404, 524/442, 449, 451; 428/402

[56] References Cited

FOREIGN PATENT DOCUMENTS

| 47-11136 | 6/1972 | Japan . |
| 48-8254 | 3/1973 | Japan . |
| 61-252135 | 11/1986 | Japan . |
| 4-339831 | 11/1992 | Japan . |

OTHER PUBLICATIONS

Hammer et al., Journal of Applied Polymer Science, vol. 1, No. 2, pp. 169–177, 1959.
Hojfors et al., J. Macromol. Sci.–Phys., B13(3), pp. 323–348, 1977.
Salaris et al., Polymer, vol. 19, pp. 1163–1170, 1978.
Plummer et al., Journal of Applied Polymer Science, vol. 55, pp. 489–500, 1995.
Cutler et al., Polymer, vol. 20, pp. 1470–1472, 1979.
Franbourg et al., Polymer Bulletin, vol. 24, pp. 445–450, 1990.
Wright et al., Polymer, vol. 29, pp. 793–796, 1988.
Runt, Journal of Materials Science, vol. 26, pp. 792–798, 1991.
Harada et al., Kagaku to Kogyo (Science and Industry), vol. 64, No. 9, pp. 454–460, 1990.

*Primary Examiner*—Samuel A. Acquah
*Attorney, Agent, or Firm*—Birch, Stewart, Kolasch & Birch, LLP

[57] ABSTRACT

An oxymethylene polymer resin shaped article having high flexural modulus, which is produced by molding an oxymethylene polymer resin, wherein the oxymethylene polymer resin is selected from the group consisting of an oxymethylene homopolymer resin, an oxymethylene copolymer resin and a mixture thereof. The oxymethylene copolymer resin comprises a copolymer of an oxymethylene monomer and a comonomer copolymerizable therewith, wherein the amount of the comonomer is extremely limited. The shaped article has the following characteristics: (1) a crystallinity of 72% or more; (2) an average crystallite size of 150 Å or more; (3) 70% by volume or more of the whole volume of the shaped article being comprised of spherulites each having a diameter of 60 μm or less; and (4) a thickness of 1 mm or more. The oxymethylene polymer resin shaped article of the present invention has an improved crystal structure, and exhibits excellent mechanical properties including especially high flexural modulus even when containing very little or no reinforcement. The oxymethylene polymer resin shaped article of the present invention can be advantageously used not only as a material for a sliding part and a precision part, such as a gear, a bearing and a lever, but also as a material for electric and electronic parts, such as a connector, a socket and a switch.

15 Claims, 1 Drawing Sheet

HIGH-RIGIDITY OXYMETHYLENE POLYMER RESIN MOLDING

This application is the national phase under 35 U.S.C. §371 of PCT International Application No. PCT/JP97/04860 which has an International filing date of Dec. 25, 1997 which designated the United States of America.

BACKGROUND OF THE INVENTION

1. Field of the Invention

The present invention relates to an oxymethylene polymer resin shaped article having high flexural modulus. More particularly, the present invention is concerned with an oxymethylene polymer resin shaped article which is produced by molding an oxymethylene polymer resin, wherein the oxymethylene polymer resin is selected from the group consisting of an oxymethylene homopolymer resin, an oxymethylene copolymer resin and a mixture thereof. The oxymethylene copolymer resin comprises a copolymer of an oxymethylene monomer and a comonomer copolymerizable therewith, wherein the amount of the comonomer is extremely limited. The shaped article has an improved crystal structure, wherein the crystallinity is 72% or more, the average crystallite size is 150 Å or more, and 70% by volume or more of the whole volume of the shaped article is comprised of spherulites each having a diameter of 60 μm or less. The shaped article also has a thickness of 1 mm or more. The oxymethylene polymer resin shaped article of the present invention exhibits excellent mechanical properties including especially high flexural modulus.

The oxymethylene polymer resin shaped article of the present invention can be advantageously used as a material for a sliding part and a precision part. Further, the oxymethylene polymer resin shaped article of the present invention exhibits high flexural modulus and high heat conductivity both at high temperatures, and, hence, can be advantageously used in the field of parts for electric and electronic apparatuses.

2. Prior Art

A shaped article of an oxymethylene polymer resin has various excellent properties, such as excellent mechanical properties, excellent fatigue resistance, excellent self-lubricating properties, and excellent heat resistance. Therefore, oxymethylene polymer resin shaped articles have been used in a wide variety of commercial applications, such as various parts for use in various machines, for example, automobiles, electric apparatuses, electronic apparatuses and office automation machines.

These commercial applications include those applications in which an oxymethylene polymer resin shaped article is required to exhibit especially high mechanical properties while maintaining the other excellent properties inherent in an oxymethylene polymer resin shaped article. In such applications, the mechanical properties of an oxymethylene polymer resin shaped article are improved by a method in which, before the molding of an oxymethylene polymer resin, a large amount of a reinforcement (filler), such as a glass fiber or a carbon fiber, is incorporated into the oxymethylene polymer resin. However, with respect to the resultant composite shaped article having incorporated thereinto a large amount of a reinforcement, there have been problems in that the shaped article has a large specific gravity, a poor sliding property and a poor surface appearance.

Therefore, various attempts have been made to improve the mechanical properties of the oxymethylene polymer resin shaped article by a method using very little or no reinforcement. Among these attempts, there have been attempts to achieve the above object by improving the crystal structure of the oxymethylene polymer resin. As examples of known methods for improving the crystal structure of the oxymethylene polymer resin in an attempt to obtain a shaped article having improved mechanical properties, there can be mentioned a method in which an oxymethylene polymer resin to be molded is subjected to isothermal crystallization at a relatively high temperature, and a method in which an oxymethylene polymer resin to be molded is subjected to annealing (see, for example, J. of Appl. Polym. Sci. vol. 1, p. 169 (1959); J. Macromol. Sci. Phys. B13(3), p. 323 (1977); Polymer vol. 19, p. 1163 (1978); and J. of Appl. Polym. Sci. vol. 55, p. 489 (1995)). The oxymethylene polymer resin shaped articles obtained by these methods are remarkably improved in crystallinity; however, these shaped articles are disadvantageous not only in that the degree of the improvement in the flexural modulus is small, but also in that the extensibility and toughness are reduced. Therefore, these oxymethylene polymer resin shaped articles cannot satisfactorily meet the needs of the commercial applications.

As further examples of known methods for improving the crystal structure of the oxymethylene polymer resin so as to improve the mechanical properties of the shaped article obtained therefrom, there can be mentioned a method in which a crystal nucleating agent is added to an oxymethylene polymer resin to be molded, and a method which utilizes a phenomenon such that when an oxymethylene polymer resin is heated to a temperature slightly higher than the melting temperature of the polymer resin, a non-melted crystal nucleus remains in the polymer resin and serves as a crystal nucleating agent. This facilitates the crystallization of the polymer resin, wherein the non-melted crystal nucleus is presumed to be a portion still having a slight regularity in structure or having an unknown specific structure. Hereinafter, this phenomenon is frequently referred to simply as "self-nucleating phenomenon" (see, for example, Polymer vol. 20, p. 1470 (1979); and Polymer Bulletin 24, p. 445 (1990)). In the oxymethylene polymer resin shaped articles obtained by these methods, the formation of spherulites having a very small diameter can be achieved. However, by these methods, it is difficult to obtain shaped articles having a remarkably improved flexural modulus. Therefore, the oxymethylene polymer resin shaped articles obtained by these methods are not always satisfactory.

Further, Polymer vol. 29, p. 793 (1988) discloses an oxymethylene homopolymer resin shaped article in which both a formation of spherulites having a very small diameter and an increase in the crystallinity have been achieved by utilizing the self-nucleating phenomenon. However, the flexural modulus of the shaped article disclosed in this prior art document is only 3.54 GPa. That is, this shaped article is not satisfactory with respect to the improvement in flexural modulus. From the molding conditions described in this prior art document, the present inventors have presumed that the reason why the oxymethylene homopolymer resin shaped article disclosed in this prior art document is not satisfactory with respect to the improvement in flexural modulus is because the growth of the crystal structure is unsatisfactory, especially the crystal structure which is evaluated in terms of an average crystallite size. As a result, a satisfactorily large average crystallite size cannot be obtained.

SUMMARY OF THE INVENTION

In this situation, the present inventors have made extensive and intensive studies with a view toward developing an oxymethylene polymer resin shaped article which exhibits excellent mechanical properties even when containing very little or no reinforcement (filler). As a result, it has unexpectedly been found that when an oxymethylene polymer resin shaped article has both a high degree of crystallization (specifically, characterized in that the crystallinity is 72% or more and the average crystallite size is 150 Å or more) and a high volume ratio of very small diameter spherulites (specifically, characterized in that 70% by volume or more of the whole volume of the shaped article is comprised of spherulites each having a diameter of 60 μm or less) and also has a thickness of 1 mm or more, the shaped article exhibits excellent mechanical properties including especially high flexural modulus. The present invention has been completed, based on the above finding.

Accordingly, it is a primary object of the present invention to provide an oxymethylene polymer resin shaped article exhibiting excellent mechanical properties including especially high flexural modulus even when containing very little or no reinforcement (filler).

The foregoing and other objects, features and advantages of the present invention will be apparent from the following detailed description taken in connection with the accompanying drawing and the appended claims.

DETAILED DESCRIPTION OF THE INVENTION

According to the present invention, there is provided an oxymethylene polymer resin shaped article having high flexural modulus, which is produced by molding an oxymethylene polymer resin. The oxymethylene polymer resin is selected from the group consisting of an oxymethylene homopolymer resin, an oxymethylene copolymer resin and a mixture thereof. The oxymethylene copolymer resin comprises polymer chains comprised of oxymethylene monomer units and oxyalkylene comonomer units. The oxyalkylene comonomer units are randomly present in the polymer chains collectively in an amount of from 0.01 to 1.0 mole, relative to 100 moles of the oxymethylene monomer units.

The shaped article has the following characteristics (1) to (4):

(1) a crystallinity of 72% or more;
(2) an average crystallite size of 150 Å or more;
(3) 70% by volume or more of the whole volume of the shaped article being comprised of spherulites each having a diameter of 60 μm or less; and
(4) a thickness of 1 mm or more.

For an easy understanding of the present invention, the essential features and various preferred embodiments of the present invention are enumerated below.

1. An oxymethylene polymer resin shaped article having high flexural modulus, which is produced by molding an oxymethylene polymer resin, the oxymethylene polymer resin being selected from the group consisting of an oxymethylene homopolymer resin, an oxymethylene copolymer resin and a mixture thereof, the oxymethylene copolymer resin comprising polymer chains comprised of oxymethylene monomer units and oxyalkylene comonomer units, wherein the oxyalkylene comonomer units are randomly present in the polymer chains collectively in an amount of from 0.01 to 1.0 mole, relative to 100 moles of the oxymethylene monomer units, the shaped article having the following characteristics (1) to (4):
(1) a crystallinity of 72% or more;
(2) an average crystallite size of 150 Å or more;
(3) 70% by volume or more of the whole volume of the shaped article being comprised of spherulites each having a diameter of 60 μm or less; and
(4) a thickness of 1 mm or more.

2. The shaped article according to item 1 above, wherein the molding is performed by injection or extrusion.

3. The shaped article according to item 1 or 2 above, wherein, in the characteristic (3), 70% by volume or more of the whole volume of the shaped article is comprised of spherulites each having a diameter of 30 μm or less.

4. The shaped article according to any one of items 1 to 3 above, wherein the oxymethylene polymer resin contains a crystal nucleating agent in an amount of from 1 ppm by weight to 5% by weight.

5. The shaped article according to item 4 above, wherein the crystal nucleating agent is at least one compound selected from the group consisting of boron nitride, talc, silica, mica and carbon black.

6. The shaped article according to any one of items 1 to 5 above, wherein, prior to the molding, the oxymethylene polymer resin is plasticized at a temperature in the range of from the melting temperature of the resin to 10° C. above the melting temperature.

7. The shaped article according to any one of items 1 to 6 above, wherein, prior to the molding, the oxymethylene polymer resin has not been heated to a temperature that is 15° C. or more higher than the melting temperature of the resin.

8. The shaped article according to any one of items 1 to 7 above, wherein the oxymethylene polymer resin is crystallized at a temperature in the range of from 30° C., below the melting temperature of the resin to the melting temperature during or after the molding.

9. The shaped article according to any one of items 1 to 8 above, wherein the oxymethylene polymer resin is annealed at a temperature in the range of from 10° C. below the melting temperature of the resin to the melting temperature after the molding.

10. The shaped article according to any one of items 1 to 9 above, wherein the oxymethylene polymer resin is an oxymethylene homopolymer resin.

11. The shaped article according to item 10 above, which has a flexural modulus of 3.8 GPa or more.

12. The shaped article according to any one of items 1 to 11 above, which is a part for an office automation machine, a part for an electric apparatus, a part for an electronic apparatus or a part for an automobile.

The oxymethylene polymer resin shaped article of the present invention is produced by injection molding or extrusion molding of an oxymethylene polymer resin, and has the following characteristics (1) to (4):
(1) a crystallinity of 72% or more;
(2) an average crystallite size of 150 Å or more;

(3) 70% by volume or more of the whole volume of the shaped article being comprised of spherulites each having a diameter of 60 μm or less; and (4) a thickness of 1 mm or more.

The oxymethylene polymer resin used for producing the shaped article of the present invention may be any of an oxymethylene homopolymer resin, an oxymethylene copolymer resin or a mixture thereof. With respect to the degree of polymerization of the oxymethylene polymer resin used in the present invention, there is no particular limitation as long as the oxymethylene polymer resin can be used for molding by a conventional molding method. For example, an oxymethylene polymer resin having a melt index (MI) of 1 to 50 g/10 min can be preferably used. The oxymethylene homopolymer used in the present invention is a homopolymer comprised essentially of oxymethylene monomer units (—$CH_2O$—), which is obtained by polymerizing formaldehyde or a cyclic oligomer of formaldehyde, such as a formaldehyde trimer (trioxane) or a formaldehyde tetramern (tetraoxane).

On the other hand, the oxymethylene copolymer resin used in the present invention comprises polymer chains comprised of oxymethylene monomer units and oxyalkylene comonomer units, and the oxyalkylene comonomer units are randomly present in the polymer chains collectively in an amount of from 0.01 to 1.0 mole, preferably 0.01 to 0.8 mole, relative to 100 moles of the oxymethylene monomer units. Examples of oxyalkylene comonomer units include oxyethylene comonomer units, linear or branched oxypropylene comonomer units, linear or branched oxybutylene comonomer units, and oxyphenylethylene comonomer units. These comonomer units may be used individually or in combination. Among these comonomer units, from the viewpoint of facilitating the improvement of the mechanical properties of the oxymethylene polymer resin shaped article, especially preferred are oxyethylene comonomer units, linear or branched oxypropylene comonomer units and linear and branched oxybutylene comonomer units.

The oxymethylene copolymer resin used in the present invention can be obtained by copolymerizing formaldehyde or a cyclic oligomer of formaldehyde, such as trioxane or tetraoxane, with a cyclic ether, such as ethylene oxide, propylene oxide, epichlorohydrin, 1,3-dioxolane, glycol formal or diglycol formal. In the present invention, the above oxymethylene polymer resins may be used individually or in combination.

The oxymethylene polymer resin shaped article of the present invention has an improved crystal structure. Specifically, in the oxymethylene polymer resin shaped article of the present invention, both a high degree of crystallization (i.e., increase in both the crystallinity and the average crystallite size) and a high volume ratio of very small diameter spherulites have been achieved.

The crystallinity of the oxymethylene polymer resin shaped article can be evaluated by various analytical methods, such as specific gravity measurement, X-ray diffraction analysis, infrared (IR) absorption spectroscopy and differential scanning calorimetry. Among these methods, X-ray diffraction analysis allows the crystallinity of the oxymethylene polymer resin shaped particle to be easily determined.

A conventional oxymethylene polymer resin shaped article generally has a crystallinity of about 55 to 70%. On the other hand, in the oxymethylene polymer resin shaped article of the present invention, it is required that the crystallinity be 72% or more. In the shaped article of the present invention, the crystallinity is preferably 75% or more, more preferably 78% or more. In the present invention, with respect to the upper limit of the range of the crystallinity of the oxymethylene polymer resin shaped article, there is no particular limitation; however, the crystallinity is generally not higher than, for example, 95%.

Explanation is made below on the average crystallite size of the oxymethylene polymer resin shaped article.

Generally, the crystal of a polymer is comprised of microcrystals, each of which is called a "crystallite" and is considered to be a single crystal. As a method for quantitatively determining an average crystallite size, the Sherrer method using X-ray diffraction analysis is widely employed. When the oxymethylene polymer resin in the present invention is subjected to X-ray diffraction analysis, an X-ray diffraction pattern having a peak at a diffraction angle (2 θ) of around 34.6° is obtained, wherein the peak is ascribed to the (105) crystal face diffraction of the oxymethylene polymer resin. With respect to the obtained X-ray diffraction pattern, the value of a half width of the peak at a diffraction angle (2 θ) of around 34.6° is obtained, and the obtained value of the half width is applied to the Sherrer's equation, thereby determining the crystallite size of the oxymethylene polymer resin. A conventional oxymethylene polymer resin shaped article generally has an average crystallite size of about 80 to 120 Å. On the other hand, in the oxymethylene polymer resin shaped article of the present invention, it is required that the average crystallite size be 150 Å or more. In the shaped article of the present invention, the average crystallite size is preferably 160 Å or more, more preferably 180 Å or more. In the present invention, with respect to the upper limit of the range of the average crystallite size of the oxymethylene polymer resin shaped article, there is no particular limitation; however, the average crystallite size is generally not higher than, for example, 300 Å.

In addition to the above-described requirements on the crystallinity and the average crystallite size, when the oxymethylene polymer resin shaped article also satisfies both the below-described requirements on the volume ratio of very small diameter spherulites and on the thickness of the shaped article, the shaped article can exhibit largely improved mechanical properties.

In a conventional oxymethylene polymer resin shaped article, generally, the diameter of each spherulite is about 100 to 300 μm. On the other hand, the oxymethylene polymer resin shaped article of the present invention has characteristics that 70% by volume or more of the whole volume of the shaped article is comprised of spherulites each having a diameter of 60 μm or less, preferably 30 μm or less, more preferably 15 μm or less. With respect to the lower limit of the range of the diameter of each of the above spherulites which constitute 70% by volume or more of the whole volume of the shaped article, there is no particular limitation; however, the diameter of each of such spherulites is generally not smaller than, for example, 0.5 to 1 μm.

Hereinbelow, a method for producing the oxymethylene polymer resin shaped article of the present invention is described.

Figure 1:
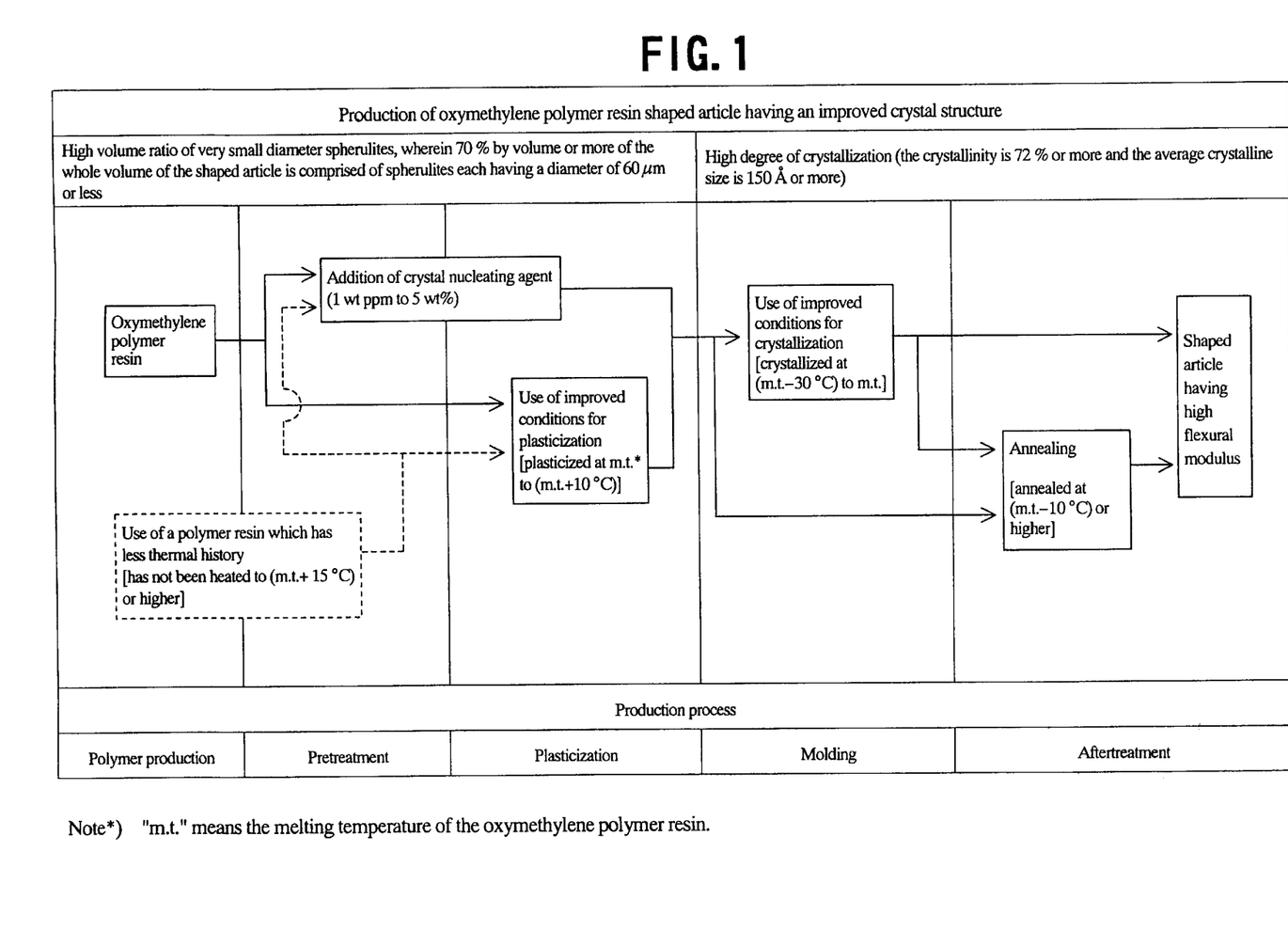
FIG. 1. is a flow chart showing how to improve the crystal structure of an oxymethylene polymer resin (i.e., achieving both a high volume ratio of very small diameter spherulites and a high degree of crystallization) in the production process for the oxymethylene polymer resin shaped article of the present invention. In the production process shown in FIG. 1, the addition of a crystal nucleating agent to the oxymethylene polymer resin and the use of improved conditions for the plasticization of the oxymethylene polymer resin may be performed in combination.

Generally, an oxymethylene polymer resin shaped article is produced through the five steps mentioned at the bottom of the flow chart of FIG. 1 (i.e., a polymer production step, a pretreatment step (pulyerization, addition of an additive, and the like), a plasticization step, a molding step, and an aftertreatment step).

The shaped article of the present invention can be produced by a method wherein, in a production process comprising the above-mentioned steps for producing an oxymethylene polymer resin shaped article, the following two operations for improving the crystal structure are performed: an operation for achieving a high volume ratio of very small diameter spherulites and an operation for achieving a high degree of crystallization (specifically, for increasing both the crystallinity and the average crystallite size).

Hereinbelow, the operation for achieving a high degree of crystallization (specifically, for increasing both the crystallinity and the average crystallite size) is first explained, and next, the operation for achieving a high volume ratio of very small diameter spherulites is explained.

Preferred examples of methods for achieving a high degree of crystallization (specifically, for increasing both the crystallinity and the average crystallite size) include the following two methods: a method in which the conditions under which the oxymethylene polymer resin is crystallized (hereinafter, frequently referred to simply as "crystallization conditions") are improved and a method in which the oxymethylene polymer resin is annealed after the molding. These two methods may be employed individually or in combination.

First, explanation is made below on the method in which the crystallization conditions for the oxymethylene polymer resin are improved.

Generally, for increasing the degree of crystallization of a polymer resin, it is effective to crystallize the polymer resin at a temperature just below a temperature which adversely affects the polymer resin (for example, just below a temperature which causes a heat decomposition of the polymer resin). However, when a polymer resin is crystallized during a conventional molding method, the crystallization temperature of the polymer resin is caused to be far lower than the melting temperature of the polymer resin. Specifically, for example, an oxymethylene homopolymer resin has a melting temperature of 176° C. On the other hand, in a conventional injection molding method, the temperature of a mold is adjusted to 100° C., or less, which is far lower than the melting temperature of the resin (i.e., 176° C.). The employment of such low temperature as the mold temperature is intended to reduce the molding cycle time. When the oxymethylene homopolymer resin is molded by such conventional injection molding method, the large difference in temperature between the mold and the molten resin injected thereinto causes the cooling rate of the injected resin in the mold to become extremely high. As a result, the injected resin in the mold suffers supercooling to a high extent. As a further result, the crystallization of the resin occurs only at a temperature as low as 145° C. or less, so that the high degree of crystallization required in the present invention cannot be achieved. The temperature range over which a resin being cooled undergoes supercooling varies depending on the cooling rate which the resin experiences when the resin is processed for crystallization. That is, the lower the rate of cooling the resin, the smaller the supercooling of the resin (i.e., the narrower the temperature range over which the supercooling occurs). Thus, the lower the rate of cooling the resin, the higher the temperature at which the crystallization of the resin occurs and, hence, the more easily the crystallization occurs. However, it should be noted that, when a resin is exposed to high temperatures for a long time, problems may arise wherein the resin is adversely affected by heat (for example, the resin suffers heat decomposition). That is, there is a dilemma such that it is difficult to achieve a high degree of crystallization for a polymer resin without adversely affecting the polymer resin. The present inventors have solved this dilemma by developing a preferred crystallization method using improved conditions for the crystallization of the polymer resin. Specifically, in the present invention, a high degree of crystallization of the oxymethylene polymer resin is achieved by a method in which the crystallization temperature for a plasticized oxymethylene polymer resin is adjusted to a relatively high temperature, namely, a temperature in the range of preferably from 30° C. below the melting temperature of the resin to the melting temperature, more preferably from 27° C. below the melting temperature of the resin to the melting temperature, still more preferably from 25° C. below the melting temperature of the resin to the melting temperature. The method for determining the melting temperature of the oxymethylene polymer resin employed in the present invention will be explained below.

As specific examples of methods for adjusting the crystallization temperature to the above specific preferred range in order to achieve a high degree of crystallization of the oxymethylene polymer resin, there can be mentioned a method in which the rate of cooling a plasticized resin introduced into a mold is adjusted by controlling the temperature of the mold and a method in which a plasticized resin introduced into a mold is subjected to isothermal crystallization. By using the above methods for adjusting the crystallization temperature, the supercooling of the resin is suppressed to a minimum, so that a high degree of crystallization of the resin can be achieved. When the rate of cooling the resin in the mold is adjusted by controlling the temperature of the mold, the cooling rate is generally adjusted to 50° C./min or less, preferably 20° C./min or less, more preferably 10° C./min or less.

When the crystallization of a plasticized resin introduced into a mold is effected by isothermal crystallization, in order to achieve crystallization of most of the resin, the crystallization (during the molding) is generally performed by a method in which the mold is maintained in a closed state and at a temperature in the above-mentioned range for 30 seconds or more, preferably 60 seconds to 10 hours. From the viewpoint of achieving a high degree of crystallization so as to obtain a shaped article having improved mechanical properties, it is preferred that the crystallization of the resin is effected at a temperature as high as possible for a time as long as possible, provided that the temperature and the time are selected so as not to adversely affect the resin (for example, so as not to cause heat decomposition thereof). In this respect, a more preferred crystallization temperature for the oxymethylene polymer resin is a temperature in the range of from 27° C. below the melting temperature of the resin to 5° C. below the melting temperature of the resin.

In the present invention, the crystallization temperature for the oxymethylene polymer resin can be any temperature within the range of from 30° C. below the melting temperature of the oxymethylene polymer resin to the melting temperature. For achieving a high degree of crystallization for the oxymethylene polymer resin, it is effective to perform the molding (during which the crystallization is effected) by a stepwise cooling type molding method in which the resin introduced into the mold is first gradually cooled to a holding temperature at which the resin can be maintained for a predetermined period of time without suffering adverse effects (for example, heat decomposition), and then the resin is maintained at the holding temperature for the predetermined period of time, followed by a further cooling of the resin. By the stepwise cooling type molding method (in which the resin is gradually cooled to a predetermined holding temperature and, then, the resin is maintained at the holding temperature for a predetermined period of time), the same effects as those obtained by annealing (optionally effected after the crystallization) can be obtained simultaneously with the crystallization. (Annealing is described below in detail.) Therefore, the stepwise cooling type molding method described above is very effective for achieving a high degree of crystallization for the oxymethylene polymer resin.

Then, as another method for achieving a high degree of crystallization (specifically, for increasing both the crystallinity and the average crystallite size), a method in which the oxymethylene polymer resin is annealed after the molding is explained below. In this method, the oxymethylene polymer resin shaped article obtained by an ordinary molding method (in which the improved crystallization conditions described above may be utilized or may not be utilized) is annealed at a very high temperature, specifically a temperature in the range of from 10° C. below the melting temperature of the oxymethylene polymer resin to the melting temperature, thereby achieving a high degree of crystallization. The "ordinary molding method" means a known molding method which is generally used for the molding of a thermoplastic resin, such as injection molding, extrusion molding, press molding (compression molding), hot pressing molding or stamping molding, wherein molding conditions generally employed in the art can be used. Of these molding methods, injection molding and extrusion molding are preferred. With respect to the conditions for the annealing of the oxymethylene polymer resin shaped article, for achieving a high degree of crystallization, it is preferred that the annealing temperature is as high as possible and the annealing time is as long as possible, provided that the annealing temperature and time are selected so as not to adversely affect the resin (for example, so as not to cause heat decomposition). From this point of view, it is preferred that the temperature for the annealing treatment is in the range of from 8° C., below the melting temperature of the oxymethylene polymer resin to the melting temperature and that the annealing time is in the range of from 30 seconds to 10 hours.

Next, a method for achieving a high volume ratio of very small diameter spherulites in producing the oxymethylene polymer resin shaped article is explained below.

As preferred examples of methods for achieving a high volume ratio of very small diameter spherulites in producing the oxymethylene polymer resin shaped article, there can be mentioned the following two methods: a method in which a crystal nucleating agent is added to an oxymethylene polymer resin to be molded and a method which utilizes improved conditions for the plasticization of an oxymethylene polymer resin in order to cause the self-nucleating phenomenon described above (i.e., a phenomenon such that a non-melted crystal nucleus remaining in a plasticized polymer resin serves as a crystal nucleating agent). These methods may be employed individually or in combination.

With respect to the method in which a high volume ratio of very small diameter spherulites is achieved using a crystal nucleating agent, it is preferred that a crystal nucleating agent is added to an oxymethylene polymer resin in an amount of from 1 ppm by weight to 5% by weight, more advantageously from 5 ppm by weight to 3% by weight, based on the weight of the oxymethylene polymer resin. Preferred examples of crystal nucleating agents used in the present invention include boron nitride, talc, silica, mica and carbon black. Alternatively, a high volume ratio of very small diameter spherulites can also be achieved by a method in which at least one polymer resin selected from the group consisting of an oxymethylene polymer resin having a low degree of polymerization (for example, one having a melt index of more than 50 g/10 min) (referred to simply as "LDP polymer") and an oxymethylene polymer resin having a branched or a crosslinked structure (referred to simply as "branched/crosslinked polymer") is used in combination with a non-branched and non-crosslinked oxymethylene polymer resin having a melt index of 1 to 50 g/10 min, wherein at least one polymer resin which is selected from the group consisting of the LDP polymer and the branched/crosslinked polymer is used in an amount of 0.1 to 50% by weight, based on the total weight of at least one polymer resin and the non-branched and non-crosslinked polymer resin.

An explanation is made below on the method in which a high volume ratio of very small diameter spherulites is achieved by utilizing improved conditions for the plasticization of the oxymethylene polymer resin in order to cause the self-nucleating phenomenon. The method comprises an operation in which, prior to the molding, the oxymethylene polymer resin is plasticized at a temperature in the range of from the melting temperature of the oxymethylene polymer resin to 10° C. above the melting temperature, more advantageously a temperature in the range of from the melting temperature of the oxymethylene polymer resin to 8° C. above the melting temperature.

An oxymethylene homopolymer resin has a melting temperature of 176° C. Conventionally, prior to the molding of such polyoxymethylene polymer resin (having a melting temperature of 176° C.), the plasticization thereof is generally performed at 200 to 220° C. However, according to the above method utilizing the improved plasticization conditions defined in the present invention, prior to the molding, such oxymethylene polymer resin (having a melting temperature of 176° C.) is plasticized at 176 to 186° C., more advantageously 176 to 184° C.

The effect of the self-nucleating phenomenon for achieving a high volume ratio of very small diameter spherulites can be largely increased by employing an appropriate oxymethylene polymer resin. Specifically, when the oxymethylene polymer resin to be subjected to the molding has not been heated to a temperature that is 15° C., or more higher than the melting temperature of the oxymethylene polymer resin, not only can the formation of very small diameter spherulites be further facilitated, but also the shaped article exhibits further excellent mechanical properties. The reason why such excellent effects can be obtained when the oxymethylene polymer resin to be subjected to the molding has less thermal history as mentioned above is presumed to be due to the fact that the use of an oxymethylene polymer resin having a high crystallinity or exhibiting a low degree of molecular chain entanglement advantageous affects the crystallization behavior of the polymer resin under the molding conditions employed in the present invention.

It is preferred that the oxymethylene polymer resin shaped article of the present invention is produced by injection molding or extrusion molding. For the oxymethylene polymer resin shaped article to exhibit a satisfactorily improved flexural modulus, it is important that the oxymethylene polymer resin shaped article be uniformly crystallized throughout the interior thereof. When the thickness of the shaped article is less than 1 mm, it is difficult to achieve a uniform crystallization for the oxymethylene polymer resin shaped article. The reason for this is as follows. Generally, an oxymethylene polymer resin shaped article has an internal structure wherein a crystallized resin layer is sandwiched between two outermost skin layers each having a molecular orientation. When the thickness of the shaped article is less than 1 mm, the ratio of the above-mentioned two skin layers in the shaped article is very large, so that the ratio of the crystallized resin layer sandwiched between the skin layers inevitably becomes very small. In such a case, it becomes difficult to control the cooling rate of the resin during the crystallization thereof, so that a non-uniform crystallization is likely occur in the shaped article. To avoid this problem, it is required that the thickness of the shaped article be at least 1 mm, as measured even at a portion having a minimum thickness.

If desired, additives may be incorporated into the oxymethylene polymer resin to be used for producing the shaped article of the present invention as long as the desired properties of the shaped article of the present invention are not sacrificed. The addition of additives to the resin and a kneading of the resultant mixture can be conducted before or during the molding. Examples of additives include polymeric materials other than the oxymethylene polymer resin used as a molding material for producing the shaped article; a multiphase interpolymer; various stabilizers, such as an antioxidant, a heat stabilizer and an ultraviolet light absorber; a dye; a pigment; a fibrous reinforcement; a particulate reinforcement; a flame retardant; and molding property modifiers, such as a plasticizer and a mold release agent.

The oxymethylene polymer resin shaped article of the present invention has an improved crystal structure, and exhibits remarkably improved mechanical properties even when containing very little or no reinforcement (filler). Therefore, the shaped article of the present invention can be advantageously used as a material for a sliding part and a precision part which are generally formed from an oxymethylene polymer resin. Specific examples of such sliding parts and precision parts include a gear, a bearing, a lever, a key stem, a cam, a ratchet, a roller, a screw, toy parts, a pipe, a fan, and a precision part comprised of a composite material. Further, the shaped article of the present invention is advantageous not only in that it exhibits high flexural modulus at a high temperature, but also in that it exhibits excellent heat conductivity by virtue of a high crystallinity. Therefore, the shaped article of the present invention can be advantageously used as a material for electric and electronic parts, such as a connector, a socket, a switch, a dial and a pin.

BEST MODE FOR CARRYING OUT THE INVENTION

Hereinbelow, the present invention will be described in more detail with reference to the following Examples and Comparative Examples, which should not be construed as limiting the scope of the present invention.

In the Examples and Comparative Examples, various properties of shaped articles were evaluated by the following methods.

(1) Melting Temperature

The melting temperature was measured using a differential scanning calorimetry apparatus (Model DSC7, manufactured and sold by Perkin Elmer Cetus Co., Ltd., U.S.A.). In the measurement, use is made of a sample prepared by a method in which an oxymethylene polymer resin was molded into a film by means of a press molding machine heated at 200° C. and the obtained film was cut so as to obtain a sample having a weight of 5 mg. The measurement was conducted under changing temperature conditions such that the temperature of the atmosphere surrounding the sample was elevated from 30° C. to 200° C. at a rate of 320° C./min and maintained at 200° C. for 2 minutes, whereupon the temperature was lowered to 130° C. at a rate of 10° C./min, and finally, elevated from 130° C. at a rate of 2.5° C./min. During the final temperature elevation, a heat absorption of the sample due to the melting of the sample was monitored, and the temperature corresponding to the apex of a peak of the heat absorption was taken as the melting temperature of the sample.

(2) Crystallinity

An oxymethylene polymer resin shaped article (the size of which is mentioned below) was subjected to cutting to reduce the width and length thereof while maintaining the thickness thereof so as to obtain a square sample (of the same thickness as that of the shaped article) having a size of 10 mm×10 mm. Using a wide-angle X-ray diffraction apparatus (manufactured and sold by MAC Science Co., Ltd., Japan), the square sample was subjected to an X-ray diffraction analysis, in which a surface of the sample perpendicular to the thicknesswise direction of the sample was scanned in a widthwise direction of the original shaped article while measuring the X-ray diffraction intensity by the 2 θ/θ scanning method under measuring conditions wherein the radiation source was Cu, the tube voltage was 40 kV and the tube current was 180 mA. The crystallinity of the sample was evaluated by means of a calculation module utilizing the peak-area crystallinity method (manufactured and sold by MAC Science Co., Ltd., Japan). Specifically, the crystallinity (Xc) was determined using the below-mentioned formula 1, from the areas of peaks at diffraction angles (2 θ) of around 22.9° and around 34.6°, which are, respectively, ascribed to the (100) crystal face diffraction and the (105) crystal face diffraction of the oxymethylene polymer resin, and from the area of a halo at a diffraction angle (2 θ) of around 20.0°.

$$Xc\,(\%) = 100 \times \frac{\text{sum of the areas of two peaks respectively ascribed to the (100) crystal face diffraction and (150) crystal face diffraction}}{\text{sum of the areas of two peaks respectively ascribed to the (100) crystal face diffraction and (150) crystal face diffraction, and the area of the halo}} \quad \text{(formula 1)}$$

(3) Crystallite Size

An oxymethylene polymer resin shaped article (the size of which is mentioned below) was subjected to cutting to reduce the width and length thereof while maintaining the thickness thereof so as to obtain a square sample (of the same thickness as that of the shaped article) having a size of 10 mm×10 mm. Using a wide-angle X-ray diffraction apparatus (manufactured and sold by MAC Science Co., Ltd., Japan), the square sample was subjected to an X-ray diffraction analysis, in which a surface of the sample perpendicular to the thicknesswise direction of the sample was scanned in a widthwise direction of the original shaped article while measuring the X-ray diffraction intensity by the 2 θ/θ scanning method under measuring conditions wherein the radiation source was Cu, the tube voltage was 40 kV and the tube current was 180 mA. The crystallite size of the sample was evaluated by means of a calculation module utilizing the Sherrer's method (manufactured and sold by MAC Science Co., Ltd., Japan), wherein the correction of the calculation was conducted using a calibration curve obtained from diffraction analysis data of a silicon powder. The calculation was performed by a method in which the value of a half width of the peak at a diffraction angle (2 θ) of around 34.6° C., ascribed to the (105) crystal face diffraction of the oxymethylene polymer resin, was obtained, and the obtained value of the half width was applied to the Sherrer's equation, thereby determining the crystallite size of the oxymethylene polymer resin.

(4) Spherulite Diameter and Volume Percentage

An oxymethylene polymer resin shaped article was cut by means of a microtome along a plane perpendicular to a surface thereof, thereby exposing a new surface. From the exposed new surface of the shaped article, a slice (specimen) having a thickness of about 5 mm was obtained using a microtome. The obtained specimen was observed through a polarization microscope (model Nikon-PFL, manufactured and sold by Nikon Corp., Japan) at a 400-time magnification in order to measure the diameters of the spherulites in the observed surface of the specimen. The volume ratio of spherulites having a specific diameter or more to the whole volume of the shaped article was calculated from the resultant data of the diameters of the spherulites in the observed surface of the specimen. Generally, the spherulite diameter of an oxymethylene polymer resin shaped article exhibits a relatively broad distribution and varies in accordance with the distance from the surface of the shaped article, and, therefore, spherulites each having substantially the same diameter are present at the same distance from the surface of the shaped article. By contrast, the production conditions employed in the present invention are advantageous not only in that a high volume ratio of very small diameter spherulites can be achieved, but also in that the spherulite diameter of the shaped article exhibits an extremely narrow distribution throughout the interior of the shaped article except for the outermost skin layers, that is, substantially all spherulites in the shaped article have substantially the same diameter, irrespective of the distance from the surface of the shaped article. Therefore, by measuring the area percentage of spherulites having a specific diameter in the entire area of the observed surface of the above specimen of the shaped article, the volume percentage of such spherulites having the specific diameter in the whole volume of the shaped article can be determined.

(5) Flexural Modulus

The flexural modulus of an oxymethylene polymer resin shaped article was evaluated at a testing environmental temperature of 23° C. in accordance with ASTM D-790. In the present invention, among various properties usable as an index of the mechanical strength of a shaped article, a flexural modulus is employed. The reason for the selection of a flexural modulus as an index is because the flexural modulus clearly represents the stiffness of a shaped article, which is a practically important property.

In the Examples and Comparative Examples, the below-mentioned oxymethylene polymer resins were subjected to molding. The measurement of the melt index (g/10 min) of the oxymethylene polymer resins was conducted in accordance with ASTM D-1238-57T (conditions E).

(1) POM1: Oxymethylene Homopolymer

POM1 was produced by a method in which a formaldehyde polymer having a melt index of 9.9 g/10 min and having its terminals stabilized by a methoxy group and an acetyl group is blended with 5 ppm by weight of a boron nitride powder (GP, average particle diameter: 3.5 μm, manufactured and sold by Denki Kagaku Kogyo Kabushiki Kaisha, Japan) as a nucleating agent, and the resultant blend is subjected to kneading and pelletization by means of an extruder which is set at a temperature of 200° C., thereby obtaining pellets (melting temperature of POM1: 176° C.).

(2) POM2: Oxymethylene Homopolymer

POM2 was produced by a method in which a formaldehyde polymer having a melt index of 9.9 g/10 min and having its terminals stabilized by a methoxy group and an acetyl group is blended with 10 ppm by weight of a boron nitride powder (GP, average particle diameter: 3.5 μm, manufactured and sold by Denki Kagaku Kogyo Kabushiki Kaisha, Japan) as a nucleating agent, and the resultant blend is subjected to kneading and pelletization by means of an extruder which is set at a temperature of 200° C., thereby obtaining pellets (melting temperature of POM2: 177° C.).

(3) POM3: Oxymethylene Homopolymer

POM3 was produced by a method in which a formaldehyde polymer having a melt index of 9.9 g/10 min and having its terminals stabilized by a methoxy group and an acetyl group is blended with 20 ppm by weight of a boron nitride powder (GP, average particle diameter: 3.5 μm, manufactured and sold by Denki Kagaku Kogyo Kabushiki Kaisha, Japan) as a nucleating agent, and the resultant blend is subjected to kneading and pelletization by means of an extruder which is set at a temperature of 200° C., thereby obtaining pellets (melting temperature of POM3: 177° C.).

(4) POM4: Oxymethylene Homopolymer

POM4 was produced by a method in which a formaldehyde polymer having a melt index of 9.9 g/10 min and having its terminals stabilized by a methoxy group and an acetyl group is subjected to kneading and pelletization by means of an extruder which is set at a temperature of 200° C., thereby obtaining pellets (melting temperature of POM4: 176° C.).

(5) POM5: Oxymethylene Homopolymer

POM5 was a powdery formaldehyde polymer having a particle diameter of several tens of μm. POM5 had a melt index of 9.9 g/10 min and had its terminals stabilized by a methoxy group and an acetyl group. POM5 had not been heated to a temperature of 190° C. or more after the production thereof (melting temperature of POM5: 177° C.).

(6) POM6: Oxymethylene Copolymer

POM6 was produced by the following method. Trioxane was copolymerized with ethylene oxide as a comonomer to obtain an oxymethylene copolymer having a melt index of 9.0 g/10 min and having an ethylene oxide unit content of 1.0 mole, relative to 100 moles of the oxymethylene units. The obtained oxymethylene copolymer was blended with 5 ppm by weight of a boron nitride powder (GP, average particle diameter: 3.5 μm, manufactured and sold by Denki Kagaku Kogyo Kabushiki Kaisha, Japan) as a nucleating agent, and the resultant blend was subjected to kneading and pelletization by means of an extruder which was set at a temperature of 200° C., thereby obtaining pellets (melting temperature of POM6: 166° C.).

(7) POM7: Oxymethylene Copolymer

POM7 was produced by the following method. Trioxane was copolymerized with ethylene oxide as a comonomer to obtain an oxymethylene copolymer having a melt index of 9.0 g/10 min and having an ethylene oxide unit content of 1.0 mole, relative to 100 moles of the oxymethylene units. The obtained oxymethylene copolymer was subjected to kneading and pelletization by means of an extruder which was set at a temperature of 200° C., thereby obtaining pellets (melting temperature of POM7: 166° C.).

(8) POM8: Oxymethylene Copolymer

POM8 was produced by the following method. Trioxane was copolymerized with ethylene oxide as a comonomer to obtain an oxymethylene copolymer having a melt index of 9.0 g/10 min and having an ethylene oxide unit content of 1.6 moles, relative to 100 moles of the oxymethylene units. The obtained oxymethylene copolymer was blended with 5 ppm by weight of a boron nitride powder (GP, average particle diameter: 3.5 μm, manufactured and sold by Denki Kagaku Kogyo Kabushiki Kaisha, Japan) as a nucleating agent, and the resultant blend was subjected to kneading and pelletization by means of an extruder which was set at a temperature of 200° C., thereby obtaining pellets (melting temperature of POM8: 164° C.).

(9) POM9: Oxymethylene Copolymer

POM9 was produced by the following method. Trioxane was copolymerized with ethylene oxide as a comonomer to obtain an oxymethylene copolymer having a melt index of 9.0 g/10 min and having an ethylene oxide unit content of 1.6 moles, relative to 100 moles of the oxymethylene units. The obtained oxymethylene copolymer was subjected to kneading and pelletization by means of an extruder which was set at a temperature of 200° C., thereby obtaining pellets (melting temperature of POM9: 164° C.).

The molding methods employed in the Examples and Comparative Examples are as follows.

(a) Conditions for plasticization: An oxymethylene polymer resin was plasticized by means of a molding machine (for injection molding or extrusion molding) which was set at a specific cylinder temperature or a hot press molding machine (press machine) which was heated at a specific temperature.

With respect to the molding machines used for plasticization, the following molding machines are identified.

Molding machine 1 (injection): the cylinder temperature was 200° C.

Molding machine 2 (injection): the cylinder temperature was 186° C.

Molding machine 3 (injection): the cylinder temperature was 184° C.

Molding machine 4 (injection): the cylinder temperature was 182° C.

Molding machine 5 (injection): the cylinder temperature was 176° C.

Molding machine 6 (injection): the cylinder temperature was 174° C.

Molding machine 7 (extrusion): the cylinder temperature was 200° C.

Molding machine 8 (extrusion): the cylinder temperature was 186° C.

Molding machine 9 (extrusion): the cylinder temperature was 184° C.

Press machine 1: the press temperature was 200° C.
Press machine 2: the press temperature was 182° C.
Press machine 3: the press temperature was 180° C.

(b) Molding Conditions Injection molding: From a polymer resin, a test piece for a flexural test was prepared in accordance with ASTM D-790, using an injection molding machine which was set at a specific cylinder temperature.

With respect to the conditions used for injection molding, the following conditions are identified.

Injection molding 1: the mold temperature was 146° C. and the cooling time was 30 seconds.

Injection molding 2: the mold temperature was 151° C. and the cooling time was 120 seconds.

Injection molding 3: the mold temperature was 153° C. and the cooling time was 180 seconds.

Injection molding 4: the mold temperature was 141° C. and the cooling time was 30 seconds.

Injection molding 5: the mold temperature was 70° C. and the cooling time was 30 seconds. Extrusion molding: From a polymer resin, a test piece was prepared using an extrusion molding machine which was set at a specific cylinder temperature and using a flat sheeting die having a thickness of 5 mm.

With respect to the conditions used for extrusion molding, the following conditions are identified.

Extrusion molding 1: the mold temperature was 146° C.
Extrusion molding 2: the mold temperature was 153° C.
Extrusion molding 3: the mold temperature was 30° C.

Press molding (compression molding): A mold filled with a polymer resin was subjected to hot pressing under a pressure of 100 kg/cm$^2$ by means of a hot press molding machine which was heated at a predetermined temperature, thereby molding the polymer resin, and then the resultant molded product was cooled at a specific cooling rate by controlling the temperature of the press molding machine, to thereby obtain a test piece.

With respect to the conditions used for press molding, the following conditions are identified.

Press molding 1: the plasticized resin in the mold was cooled to 70° C. at a cooling rate of 50° C./min.

Press molding 2: the plasticized resin in the mold was cooled to 70° C. at a cooling rate of 5° C./min.

Press molding 3: the plasticized resin in the mold was cooled to 150° C. at a cooling rate of 2° C./min, and then maintained at 150° C. for 3 hours.

Press molding 4: the plasticized resin in the mold was cooled to 153° C. at a cooling rate of 2° C./min, and then maintained at 153° C. for 3 hours.

(c) Shape of a sample (test piece) of shaped article: A sample of shaped article had the following size: a thickness of about 3 mm, about 1 mm or about 0.5 mm; a width of about 13 mm; and a length of about 130 mm.

(d) Annealing conditions: A molded test piece was treated in an air oven which was set at a predetermined temperature for 1 hour.

With respect to the annealing conditions, the following conditions are identified.

Annealing 1: no annealing.
Annealing 2: annealing temperature was 172° C.
Annealing 3: annealing temperature was 170° C.
Annealing 4: annealing temperature was 150° C.

Examples 1 to 11

Oxymethylene homopolymer resins were individually molded by using an injection molding machine to thereby obtain test pieces (shaped articles). The obtained test pieces were evaluated by conducting an observation using a polarization microscope, a measurement of the crystallinity and the average crystallite size, and a flexural test. The conditions for the production of the test pieces and the results of the evaluation of the test pieces are shown in Table 1.

Examples 12 to 15

Oxymethylene homopolymer resins were individually molded by using an extrusion molding machine to thereby obtain test pieces (shaped articles). The obtained test pieces were evaluated by conducting an observation using a polarization microscope, a measurement of the crystallinity and the average crystallite size, and a flexural test. The conditions for the production of the test pieces and the results of the evaluation of the test pieces are shown in Table 1.

Examples 16 to 24

Oxymethylene homopolymer resins were individually molded by using a hot press molding machine to thereby obtain test pieces (shaped articles) The obtained test pieces were evaluated by conducting an observation using a polarization microscope, a measurement of the crystallinity and the average crystallite size, and a flexural test. The conditions for the production of the test pieces and the results of the evaluation of the test pieces are shown in Table 1.

Examples 25 to 28

Oxymethylene homopolymer resins were individually molded by using an injection molding machine to thereby obtain test pieces (shaped articles), and the obtained test pieces were subjected to annealing by means of an air oven. The resultant annealed test pieces were evaluated by conducting an observation using a polarization microscope, a measurement of the crystallinity and the average crystallite size, and a flexural test. The conditions for the production of the test pieces and the results of the evaluation of the test pieces are shown in Table 1. With respect to the shaped article obtained in Example 26, the stiffness thereof at a high temperature was evaluated by measuring its deflection temperature under load in accordance with ASTM-D648 (wherein a temperature at which a test piece is deflected by 0.2 mm under a load of 18.6 kg/cm² is measured). It was found that the shaped article obtained in Example 26 exhibited a deflection temperature under load of 155° C.

Comparative Examples 1 to 6

Oxymethylene homopolymer resins were individually molded by using an injection molding machine to thereby obtain test pieces (shaped articles). The obtained test pieces were evaluated by conducting an observation using a polarization microscope, a measurement of the crystallinity and the average crystallite size, and a flexural test. The conditions for the production of the test pieces and the results of the evaluation of the test pieces are shown in Table 1. With respect to the shaped article obtained in Comparative Example 1, the stiffness thereof at a high temperature was evaluated by measuring its deflection temperature under load in accordance with ASTM-D648 (wherein a temperature at which a test piece is deflected by 0.2 mm under a load of 18.6 kg/cm² is measured). It was found that the shaped article obtained in Comparative Example 1 exhibited a deflection temperature under load of 136° C.

Comparative Example 7

An oxymethylene homopolymer resin was molded by using an extrusion molding machine to thereby obtain a test piece (shaped article). The obtained test piece was evaluated by conducting an observation using a polarization microscope, a measurement of the crystallinity and the average crystallite size, and a flexural test. The conditions for the production of the test piece and the results of the evaluation of the test piece are shown in Table 1.

Examples 29 to 30

Oxymethylene copolymer resins were individually molded by using an injection molding machine to thereby obtain test pieces (shaped articles). The obtained test pieces were evaluated by conducting an observation using a polarization microscope, a measurement of the crystallinity and the average crystallite size, and a flexural test. The conditions for the production of the test pieces and the results of the evaluation of the test pieces are shown in Table 2.

Comparative Examples 8 to 13

Oxymethylene copolymer resins were individually molded by using an injection molding machine to thereby obtain test pieces (shaped articles). The obtained test pieces were evaluated by conducting an observation using a polarization microscope, a measurement of the crystallinity and the average crystallite size, and a flexural test. The conditions for the production of the test pieces and the results of the evaluation of the test pieces are shown in Table 2.

Comparative Example 14

An oxymethylene copolymer resin was molded by using an injection molding machine to thereby obtain a test piece (shaped article), and the obtained test piece was subjected to annealing by means of an air oven. The resultant annealed test piece was evaluated by conducting an observation using a polarization microscope, a measurement of the crystallinity and the average crystallite size, and a flexural test. The conditions for the production of the test piece and the results of the evaluation of the test piece are shown in Table 2.

TABLE 1

| | Molding material (oxymethylene homopolymer resin) | Plasticization conditions* | Molding conditions | Annealing conditions | Thickness (mm) | Crystallinity (%) | Average crystallite size (Å) | Diameter of spherulites constituting 70% by volume or more of the whole volume of the shaped article (μm) | Flexural modulus (GPa) |
|---|---|---|---|---|---|---|---|---|---|
| Example 1 | POM1 | Molding machine 1 | Injection molding 1 | Annealing 1 | 3 | 75 | 152 | 30 | 3.8 |
| Example 2 | POM1 | Molding machine 1 | Injection molding 2 | Annealing 1 | 3 | 78 | 164 | 35 | 3.9 |
| Example 3 | POM2 | Molding machine 1 | Injection molding 2 | Annealing 1 | 3 | 78 | 165 | 15 | 4 |
| Example 4 | POM3 | Molding machine 1 | Injection molding 3 | Annealing 1 | 3 | 80 | 180 | 10 | 4.8 |
| Example 5 | POM4 | Molding machine 2 | Injection molding 1 | Annealing 1 | 3 | 76 | 155 | 28 | 3.9 |
| Example 6 | POM4 | Molding machine 3 | Injection molding 1 | Annealing 1 | 3 | 77 | 158 | 15 | 4 |
| Example 7 | POM4 | Molding machine 3 | Injection molding 2 | Annealing 1 | 3 | 78 | 166 | 15 | 4.2 |
| Example 8 | POM4 | Molding machine 3 | Injection molding 3 | Annealing 1 | 3 | 80 | 172 | 15 | 4.8 |
| Example 9 | POM5 | Molding machine 3 | Injection molding 2 | Annealing 1 | 3 | 79 | 168 | 3 | 4.6 |

TABLE 1-continued

| | Molding material (oxymethylene homopolymer resin) | Plasticization conditions* | Molding conditions | Annealing conditions | Thickness (mm) | Crystallinity (%) | Average crystallite size (Å) | Diameter of spherulites constituting 70% by volume or more of the whole volume of the shaped article (μm) | Flexural modulus (GPa) |
|---|---|---|---|---|---|---|---|---|---|
| Example 10 | POM5 | Molding machine 4 | Injection molding 3 | Annealing 1 | 3 | 81 | 190 | 3 | 5.3 |
| Example 11 | POM1 | Molding machine 1 | Injection molding 1 | Annealing 1 | 1 | 74 | 152 | 30 | 3.6 |
| Example 12 | POM1 | Molding machine 7 | Extrusion molding 1 | Annealing 1 | 3 | 76 | 153 | 30 | 3.9 |
| Example 13 | POM3 | Molding machine 7 | Extrusion molding 2 | Annealing 1 | 3 | 82 | 181 | 10 | 4.9 |
| Example 14 | POM4 | Molding machine 8 | Extrusion molding 1 | Annealing 1 | 3 | 77 | 156 | 28 | 4.0 |
| Example 15 | POM4 | Molding machine 9 | Extrusion molding 2 | Annealing 1 | 3 | 81 | 175 | 15 | 4.9 |
| Example 16 | POM2 | Press machine 1 | Press molding 1 | Annealing 1 | 3 | 76 | 166 | 20 | 3.9 |
| Example 17 | POM2 | Press machine 1 | Press molding 2 | Annealing 1 | 3 | 78 | 168 | 22 | 4.1 |
| Example 18 | POM2 | Press machine 1 | Press molding 3 | Annealing 1 | 3 | 79 | 172 | 22 | 4.3 |
| Example 19 | POM3 | Press machine 1 | Press molding 4 | Annealing 1 | 3 | 81 | 190 | 15 | 4.9 |
| Example 20 | POM4 | Press machine 2 | Press molding 1 | Annealing 1 | 3 | 77 | 167 | 13 | 4.2 |
| Example 21 | POM4 | Press machine 2 | Press molding 2 | Annealing 1 | 3 | 78 | 169 | 14 | 4.5 |
| Example 22 | POM4 | Press machine 2 | Press molding 3 | Annealing 1 | 3 | 79 | 175 | 13 | 4.7 |
| Example 23 | POM5 | Press machine 2 | Press molding 3 | Annealing 1 | 3 | 79 | 180 | 3 | 5.2 |
| Example 24 | POM5 | Press machine 3 | Press molding 4 | Annealing 1 | 3 | 81 | 220 | 3 | 6.3 |
| Example 25 | POM2 | Molding machine 1 | Injection molding 5 | Annealing 3 | 3 | 79 | 170 | 15 | 4.4 |
| Example 26 | POM3 | Molding machine 1 | Injection molding 5 | Annealing 2 | 3 | 80 | 200 | 10 | 5.2 |
| Example 27 | POM4 | Molding machine 3 | Injection molding 5 | Annealing 3 | 3 | 79 | 175 | 15 | 4.6 |
| Example 28 | POM5 | Molding machine 3 | Injection molding 5 | Annealing 2 | 3 | 80 | 200 | 3 | 6.2 |
| Comparative Example 1 | POM2 | Molding machine 1 | Injection molding 5 | Annealing 1 | 3 | 69 | 110 | 15 | 3.2 |
| Comparative Example 2 | POM4 | Molding machine 1 | Injection molding 5 | Annealing 1 | 3 | 69 | 106 | 120 | 3.2 |
| Comparative Example 3 | POM4 | Molding machine 1 | Injection molding 1 | Annealing 1 | 3 | 76 | 164 | 120 | 3.4 |
| Comparative Example 4 | POM4 | Molding machine 1 | Injection molding 2 | Annealing 1 | 3 | 78 | 164 | 120 | 3.4 |
| Comparative Example 5 | POM4 | Molding machine 3 | Injection molding 5 | Annealing 1 | 3 | 69 | 110 | 15 | 3.2 |
| Comparative Example 6 | POM1 | Molding machine 1 | Injection molding 1 | Annealing 1 | 0.5 | 72 | 150 | 30 | 3.3 |
| Comparative Example 7 | POM2 | Molding machine 7 | Extrusion molding 3 | Annealing 1 | 3 | 68 | 105 | 15 | 3.2 |

*Note:
Molding machines 1 to 6 are injection molding machines.
Molding machines 7 to 9 are extrusion molding machines.
Press machines 1 to 3 are press molding machines.

TABLE 2

| | Molding material (oxymethylene homopolymer resin) | Plasticization conditions* | Molding conditions | Annealing conditions | Thickness (mm) | Crystallinity (%) | Average crystallite size (Å) | Diameter of spherulites constituting 70% by volume or more of the whole volume of the shaped article (μm) | Flexural modulus (GPa) |
|---|---|---|---|---|---|---|---|---|---|
| Example 29 | POM6 | Molding machine 1 | Injection molding 4 | Annealing 1 | 3 | 72 | 160 | 45 | 3 |
| Example 30 | POM7 | Molding machine 5 | Injection molding 4 | Annealing 1 | 3 | 72 | 161 | 30 | 3 |
| Comparative Example 8 | POM6 | Molding machine 1 | Injection molding 5 | Annealing 1 | 3 | 65 | 112 | 45 | 2.6 |
| Comparative Example 9 | POM7 | Molding machine 1 | Injection molding 5 | Annealing 1 | 3 | 65 | 112 | 140 | 2.6 |
| Comparative Example 10 | POM7 | Molding machine 1 | Injection molding 4 | Annealing 1 | 3 | 67 | 150 | 140 | 2.7 |
| Comparative Example 11 | POM7 | Molding machine 5 | Injection molding 5 | Annealing 1 | 3 | 65 | 112 | 30 | 2.6 |
| Comparative Example 12 | POM8 | Molding machine 1 | Injection molding 4 | Annealing 1 | 3 | 62 | 110 | 40 | 2.5 |
| Comparative Example 13 | POM9 | Molding machine 6 | Injection molding 4 | Annealing 1 | 3 | 62 | 110 | 31 | 2.5 |
| Comparative Example 14 | POM6 | Molding machine 1 | Injection molding 5 | Annealing 4 | 3 | 67 | 150 | 45 | 2.7 |

*Note:
Molding machines 1 to 6 are injection molding machines.
Molding machines 7 to 9 are extrusion molding machines.
Press machines 1 to 3 are press molding machines.

INDUSTRIAL APPLICABILITY

The oxymethylene polymer resin shaped article of the present invention has an improved crystal structure, and exhibits remarkably improved mechanical properties even when containing very little or no reinforcement (filler). Therefore, the shaped article of the present invention can be advantageously used as a material for a sliding part and a precision part which are generally formed from an oxymethylene polymer resin. Specific examples of such sliding parts and precision parts include a gear, a bearing, a lever, a key stem, a cam, a ratchet, a roller, a screw, toy parts, a pipe, a fan, and a precision part comprised of a composite material. Further, the shaped article of the present invention is advantageous not only in that it exhibits high flexural modulus at a high temperature, but also in that it exhibits excellent heat conductivity by virtue of the high crystallinity. Therefore, the shaped article of the present invention can be advantageously used as a material for electric and electronic parts, such as a connector, a socket, a switch, a dial and a pin.

What is claimed is:

1. An oxymethylene polymer resin shaped article having high flexural modulus, which is produced by molding an oxymethylene polymer resin, said oxymethylene polymer resin being selected from the group consisting of an oxymethylene homopolymer resin, an oxymethylene copolymer resin and a mixture thereof, said oxymethylene copolymer resin comprising polymer chains comprised of oxymethylene monomer units and oxyalkylene comonomer units, wherein said oxyalkylene comonomer units are randomly present in said polymer chains collectively in an amount of from 0.01 to 1.0 mole, relative to 100 moles of said oxymethylene monomer units, said shaped article having the following characteristics (1) to (4):
(1) a crystallinity of 72% or more;
(2) an average crystallite size of 150 Å or more;
(3) 70% by volume or more of the whole volume of said shaped article being comprised of spherulites each having a diameter of 60 μm or less; and
(4) a thickness of 1 mm or more.

2. The shaped article according to claim 1, wherein the molding is performed by injection or extrusion.

3. The shaped article according to claim 1 or 2, wherein, in said characteristic (3), 70% by volume or more of the whole volume of said shaped article is comprised of spherulites each having a diameter of 30 μm or less.

4. The shaped article according to claim 1 or 2, wherein said oxymethylene polymer resin contains a crystal nucleating agent in an amount of from 1 ppm by weight to 5% by weight.

5. The shaped article according to claim 4, wherein said crystal nucleating agent is at least one compound selected from the group consisting of boron nitride, talc, silica, mica and carbon black.

6. The shaped article according to claim 1 or 5, wherein, prior to the molding, said oxymethylene polymer resin is plasticized at a temperature in the range of from the melting temperature of said resin to 10° C. above said melting temperature.

7. The shaped article according claim 1 to 2, wherein, prior to the molding, said oxymethylene polymer resin has not been heated to a temperature that is 15° C. or more higher than the melting temperature of said resin.

8. The shaped article according to claim 1 to 2, wherein said oxymethylene polymer resin is crystallized at a temperature in the range of from 30° C. below the melting temperature of said resin to said melting temperature during or after the molding.

9. The shaped article according to claim 1 to 2, wherein said oxymethylene polymer resin is annealed at a temperature in the range of from 10° C. below the melting temperature of said resin to said melting temperature after the molding.

10. The shaped article according to claim 1 to 2, wherein said oxymethylene polymer resin is an oxymethylene homopolymer resin.

11. The shaped article according to claim 10, which has a flexural modulus of 3.8 GPa or more.

12. The shaped article according to claim 1 to 2, which is a part for an office automation machine, a part for an electric apparatus, a part for electronic apparatus or a part for an automobile.

13. An oxymethylene polymer resin shaped article having high flexural modulus, which is produced by molding an oxymethylene polymer resin, said oxymethylene polymer resin being selected from the group consisting of an oxymethylene homopolymer resin, an oxymethylene copolymer resin and a mixture thereof, said oxymethylene copolymer resin comprising polymer chains comprised of oxymethylene monomer units and oxyalkylene comonomer units, wherein said oxyalkylene comonomer units are randomly present in said polymer chains collectively in an amount of from 0.01 to 1.0 mole, relative to 100 moles of said oxymethylene monomer units, and wherein said oxymethylene polymer resin contains a crystal nucleating agent in an amount of from 1 ppm by weight to 5% by weight;

said shaped article having the following characteristics (1) to (4):
(1) a crystallinity of 72% or more;
(2) an average crystallite size of 150 Å or more;
(3) 70% by volume or more of the whole volume of the shaped article being comprised of spherulites each having a diameter of 60 $\mu$m or less; and
(4) a thickness of 1 mm or more.

14. The shaped article according to claim 13, wherein said crystal nucleating agent is at least one compound selected from the group consisting of boron nitride, talc, silica, mica and carbon black.

15. An oxymethylene polymer resin shaped article having high flexural modulus, which is produced by molding an oxymethylene polymer resin, said oxymethylene polymer resin being selected from the group consisting of an oxymethylene homopolymer resin, an oxymethylene copolymer resin and a mixture thereof, said oxymethylene copolymer resin comprising polymer chains comprised of oxymethylene monomer units and oxyalkylene comonomer units, wherein said oxyalkylene comonomer units are randomly present in said polymer chains collectively in an amount of from 0.01 to 1.0 mole, relative to 100 moles of said oxymethylene monomer units; and wherein prior to molding, said oxymethylene polymer resin is plasticized at a temperature in the range of from the melting temperature of said resin to 10° C. above said melting temperature;

said shaped article having the following characteristics (1) to (4):
(1) a crystallinity of 72% or more;
(2) an average crystallite size of 150 Å or more;
(3) 70% by volume or more of the whole volume of the shaped article being comprised of spherulites each having a diameter of 60 $\mu$m or less; and
(4) a thickness of 1 mm or more.

* * * * *